United States Patent
Jubb

(10) Patent No.: US 8,088,701 B2
(45) Date of Patent: Jan. 3, 2012

(54) INORGANIC FIBRE COMPOSITIONS

(75) Inventor: Gary Anthony Jubb, Bromborough (GB)

(73) Assignee: The Morgan Crucible Company PLC, Windsor, Berkshire (GB)

( * ) Notice: Subject to any disclaimer, the term of this patent is extended or adjusted under 35 U.S.C. 154(b) by 142 days.

(21) Appl. No.: 12/515,873

(22) PCT Filed: Nov. 23, 2007

(86) PCT No.: PCT/GB2007/004509
§ 371 (c)(1), (2), (4) Date: May 21, 2009

(87) PCT Pub. No.: WO2008/065363
PCT Pub. Date: Jun. 5, 2008

(65) Prior Publication Data
US 2010/0055457 A1 Mar. 4, 2010

Related U.S. Application Data

(60) Provisional application No. 60/867,421, filed on Nov. 28, 2006.

(30) Foreign Application Priority Data

Nov. 28, 2006 (GB) .................................. 0623770.5

(51) Int. Cl.
*C03C 13/06* (2006.01)
*C03C 13/00* (2006.01)
*C03C 3/083* (2006.01)
*C03C 3/062* (2006.01)

(52) U.S. Cl. ................. 501/36; 501/35; 501/68; 501/73

(58) Field of Classification Search .................... 501/35, 501/36, 68, 73
See application file for complete search history.

(56) References Cited

U.S. PATENT DOCUMENTS

| | | | |
|---|---|---|---|
| 2,710,261 A | 5/1952 | McMullen | |
| 4,604,366 A | 8/1986 | Kacicz et al. | |
| 4,867,779 A * | 9/1989 | Meunier et al. | 71/62 |
| 5,037,470 A * | 8/1991 | Matzen et al. | 71/52 |
| 5,108,957 A * | 4/1992 | Cohen et al. | 501/35 |
| 5,250,488 A | 10/1993 | Thelohan et al. | |
| 5,554,324 A | 9/1996 | Bernard et al. | |
| 6,043,170 A | 3/2000 | Steinkopf et al. | |
| 6,128,430 A | 10/2000 | Chu et al. | |
| 6,235,136 B1 * | 5/2001 | Kittson et al. | 156/166 |
| 6,284,684 B1 | 9/2001 | Vignesoult et al. | |
| 6,897,173 B2 * | 5/2005 | Bernard et al. | 501/36 |
| 7,803,729 B2 * | 9/2010 | Keller et al. | 442/340 |
| 2002/0086796 A1 * | 7/2002 | Eckardt et al. | 502/339 |
| 2002/0169231 A1 * | 11/2002 | Okayama et al. | 523/156 |
| 2003/0015003 A1 | 1/2003 | Fisler et al. | |
| 2003/0181306 A1 | 9/2003 | Bernard et al. | |
| 2004/0253321 A1 | 12/2004 | Fechner et al. | |
| 2006/0211562 A1 * | 9/2006 | Fisler | 501/36 |
| 2007/0184740 A1 | 8/2007 | Keller et al. | |
| 2008/0191179 A1 | 8/2008 | Bernard et al. | |

FOREIGN PATENT DOCUMENTS

| | | |
|---|---|---|
| EP | 0 155 564 | 9/1985 |
| EP | 0 399 320 | 5/1990 |
| EP | 0 412 878 A1 | 8/1990 |
| EP | 0 459 897 A1 | 5/1991 |
| EP | 0 586 797 A1 | 6/1993 |
| EP | 1 323 687 A2 | 7/2003 |
| EP | 1 868 954 B1 | 9/2008 |
| FR | 2 662 687 | 6/1990 |
| FR | 2 662 688 | 6/1990 |
| FR | 2 778 401 | 5/1998 |
| JP | 42-23594 | 11/1942 |
| JP | 2002513730 | 5/2002 |
| JP | 20060625212 | 11/2006 |
| WO | WO 86/04807 | 8/1986 |
| WO | WO 86/07050 | 12/1986 |
| WO | WO 87/05007 | 8/1987 |
| WO | WO 89.12032 | 12/1989 |
| WO | WO 90/02713 | 3/1990 |
| WO | WO 92/09536 | 6/1992 |
| WO | WO 93/15028 | 8/1993 |
| WO | WO 93/22251 | 11/1993 |
| WO | WO 94/15883 | 7/1994 |
| WO | WO 96/04214 | 2/1996 |
| WO | WO 97/16386 | 5/1997 |
| WO | WO00/15573 | 3/2000 |
| WO | WO 03/050054 A1 | 6/2003 |
| WO | WO 03/059835 A1 | 7/2003 |
| WO | WO 2005/000754 A1 | 1/2005 |
| WO | WO 2005/000971 A2 | 1/2005 |
| WO | WO 2005035895 A1 * | 4/2005 |
| WO | WO 2006/048610 A1 | 5/2006 |
| WO | WO 2006/103375 A2 | 10/2006 |
| WO | WO 2007/054697 A1 | 5/2007 |
| WO | WO 2008/065363 A1 | 6/2008 |

OTHER PUBLICATIONS

Preliminary Notice of Reasons for Rejection dated on Oct. 8, 2010 for Application No. 2009-537702.
Technical Report: "In-vitro dissolution rate of mineral fibres at pH 4.5 and 7.4—A new mathematical tool to evaluate the dependency on compositions"; Torben Knudsen and Marianne Guldberg; Rockwool International A/S, Hedehusene, Denmark, 2005.

* cited by examiner

*Primary Examiner* — Karl Group
*Assistant Examiner* — Elizabeth A Bolden
(74) *Attorney, Agent, or Firm* — Smith, Gambrell & Russell, LLP

(57) ABSTRACT

Melt formed inorganic fibers are disclosed having the composition:—

| | |
|---|---|
| $Al_2O_3$ | 5-90 mol % |
| $K_2O$ | 5-90 mol % |
| $SiO_2$ | 5-90 mol % | in which $SiO_2 + Al_2O_3 + K_2O \geq 50$ mol %.
Fibers of like composition having $K_2O$ greater than 12 mol % are also encompassed.

42 Claims, No Drawings

INORGANIC FIBRE COMPOSITIONS

REFERENCE TO RELATED APPLICATIONS

This application claims the benefit of United Kingdom Application No. PCT/GB2007/004509 filed Nov. 23, 2007; United Kingdom Application No. 0623770.5 filed Nov. 28, 2006 and U.S. Provisional Application No. 60/867,421 filed Nov. 28, 2006, which are all relied on and incorporated herein by reference.

INTRODUCTION AND BACKGROUND

This invention relates to inorganic fibre compositions.

Fibrous materials are well known for their use as thermal and/or acoustic insulating materials and are also known for their use as strengthening constituents in composite materials such as, for example, fibre reinforced cements, fibre reinforced plastics, and as a component of metal matrix composites. Such fibres may be used in support structures for catalyst bodies in pollution control devices such as automotive exhaust system catalytic converters and diesel particulate filters. Such fibres may be used as a constituent of friction materials [e.g. for automotive brakes]. The fibres of the present invention have a range of properties and may be usable in any or all of these applications depending on the properties shown.

Prior to 1987 there were four principle types of fibrous materials used for making thermal insulation products [such as, for example, blanket, vacuum formed shapes, and mastics]. These were made by two principal manufacturing routes, although the details of the particular routes vary according to manufacturer. The fibres and routes were (in order of increasing cost and temperature performance):—

Melt Formed Fibres
    Mineral wools
    Glass wools
    Aluminosilicate fibres
Sol-Gel Process Fibres
    So-called polycrystalline fibres Melt formed fibres are formed by making a melt and fiberising the resultant melt by any one of the many known methods. These methods include:—
- forming a stream of melt and allowing the stream to contact spinning wheels from which it is flung to form fibres
- forming a stream of melt and allowing the stream to impinge upon a jet of gas that may be transverse, parallel with, or at an angle to the direction of the stream and thereby blasting the melt into fibres
- forming a fibre from the melt by a rotary process in which the melt escapes through apertures in the circumference of a spinning cup and is blasted by hot gases to form fibres
- extruding the melt through fine apertures to form filaments, and in which further treatment may be used [e.g. flame attenuation in which the filament is passed through a flame]
- or any other method by which a melt is converted into a fibre.

Because of the history of asbestos fibres, a lot of attention has been paid to the relative potency of a wide range of fibre types as a cause of lung disease. Studies of the toxicology of natural and man-made fibres led to the idea that it was the persistence of fibres in the lung that caused problems. Accordingly, the view developed that if fibres can be removed from the lung quickly then any risk to health would be minimised. The concepts of "biopersistent fibres" and "biopersistence" arose—fibres that last for a long time in the animal body are considered biopersistent and the relative time that fibres remain in the animal body is known as biopersistence. Whilst several glass systems were known to be soluble in lung fluids, resulting in low biopersistence, there was a problem in that such glass systems were generally not useful for high temperature applications. A market need was seen for a fibre that could have a low biopersistence combined with a high temperature capability. In 1987 Johns Manville developed such a system based on a calcium magnesium silicate chemistry. Such material not only had a higher temperature capability than traditional glass wools, but also had a higher solubility in body fluids than the aluminosilicate fibres mostly used for high temperature insulation. Such low biopersistent fibres have been developed since, and a range of alkaline earth silicate [AES] fibres are now on the market.

Patents relating to AES fibres include:
- International Patent Application No. WO87/05007—the original Johns-Manville application—which disclosed that fibres comprising magnesia, silica, calcia and less than 10 wt % alumina are soluble in saline solution. The solubilities of the fibres disclosed were in terms of parts per million of silicon (extracted from the silica containing material of the fibre) present in a saline solution after 5 hours of exposure.
- International Patent Application No. WO89/12032 disclosed additional fibres soluble in saline solution and discussed some of the constituents that may be present in such fibres.
- European Patent Application No. 0399320 disclosed glass fibres having a high physiological solubility and having 10-20 mol % $Na_2O$ and 0-5 mol % $K_2O$. Although these fibres were shown to be physiologically soluble their maximum use temperature was not indicated.

Further patent specifications disclosing selection of fibres for their saline solubility include for example European 0412878 and 0459897, French 2662687 and 2662688, WO86/04807, WO90/02713, WO92/09536, WO93/22251, WO93/15028, WO94/15883, WO97/16386, WO2003/059835, WO2003/060016, EP1323687, WO2005/000754, WO2005/000971, and U.S. Pat. No. 5,250,488.

The refractoriness of the fibres disclosed in these various prior art documents varies considerably and for these alkaline earth silicate materials the properties are critically dependent upon composition.

As a generality, it is relatively easy to produce alkaline earth silicate fibres that perform well at low temperatures, since for low temperature use one can provide additives such as boron oxide to ensure good fiberisation and vary the amounts of the components to suit desired material properties. However, as one seeks to raise the refractoriness of alkaline earth silicate fibres, one is forced to reduce the use of additives, since in general (albeit with exceptions) the more components are present, the lower the refractoriness.

WO93/15028 disclosed fibres comprising CaO, MgO, $SiO_2$, and optionally $ZrO_2$ as principal constituents. Such AES fibres are also known as CMS (calcium magnesium silicate) or CMZS (calcium magnesium zirconium silicate) fibres. WO93/15028 required that the compositions used should be essentially free of alkali metal oxides. Amounts of up to 0.65 wt % were shown to be acceptable for materials suitable for use as insulation at 1000° C.

WO93/15028 also disclosed methods of predicting the solubility of glasses and included a range of materials that were tested as glasses for their solubility, but not formed as fibres. Among these compositions were compositions having the reference KAS, KMAS, and KNAS which were respectively a potassium aluminosilicate, a potassium magnesium aluminosilicate, and a potassium sodium aluminosilicate. These compositions were rated as having insufficient solubility on the basis of solubility measurements in a physiological like solution. The type of physiological solution used has a pH of about 7.4.

It has subsequently been found that solubility depends on the environment within which a fibre finds itself. Although the physiological saline solution present in intercellular lung fluid approximates to that given in WO93/15028, and has a pH of around pH 7.4, the mechanism for clearing fibres involves their attack by macrophages. It is known that the pH of the physiological saline present where the macrophages contact fibres is significantly lower (around pH 4.5) and this has an effect on solubility of inorganic fibres [see "*In-vitro dissolution rate of mineral fibres at pH 4.5 and 7.4—A new mathematical tool to evaluate the dependency an composition*" Torben Knudsen and Marianne Guldberg, Glass Sci. Technol. 78(205) No. 3].

WO94/15883 disclosed a number of such fibres usable as refractory insulation at temperatures up to 1260° C. or more. As with WO93/15028, this patent required that the alkali metal oxide content should be kept low, but indicated that some alkaline earth silicate fibres could tolerate higher levels of alkali metal oxide than others. However, levels of 0.3% and 0.4% by weight $Na_2O$ were suspected of causing increased shrinkage in materials for use as insulation at 1260° C.

WO97/16386 disclosed fibres usable as refractory insulation at temperatures of up to 1260° C. or more. These fibres comprised MgO, $SiO_2$, and optionally $ZrO_2$ as principal constituents. These fibres are stated to require substantially no alkali metal oxides other than as trace impurities (present at levels of hundredths of a percent at most calculated as alkali metal oxide). The fibres have a general composition

| | |
|---|---|
| $SiO_2$ | 65-86% |
| MgO | 14-35% | with the components MgO and $SiO_2$ comprising at least 82.5% by weight of the fibre, the balance being named constituents and viscosity modifiers.

WO2003/059835 discloses certain calcium silicate fibres in which $La_2O_3$ or other lanthanide additives are used to improve the strength of the fibres and blanket made from the fibres. This patent application does not mention alkali metal oxide levels, but amounts in the region of ~0.5 wt % were disclosed in fibres intended for use as insulation at up to 1260° C. or more.

WO2006/048610 disclosed that for AES fibres it was advantageous to mechanical and thermal properties to include small amounts of alkali metal oxides.

The scope of such low biopersistence fibres is limited, in that above about 1300° C. they tend to deteriorate in performance.

Alternative low biopersistence fibres that have been proposed are alkaline earth aluminates. Such materials have been suggested as calcium aluminate (EP0586797) and strontium aluminate (WO96/04214). Such fibres are not produced commercially.

The applicants have developed sol-gel fibres comprising aluminosilicates having significant additions of alkaline earth metal oxides or alkali metal oxides and these are subject of International patent application No. PCT/GB2006/004182.

SUMMARY OF THE INVENTION

The applicants have now developed an alternative fibre chemistry that provides low biopersistence fibres, for which some fibres at least are capable of providing fibres of comparable thermal performance to aluminosilicate fibres.

Accordingly, the present invention provides melt formed inorganic fibres having the composition:—

| | |
|---|---|
| $Al_2O_3$ | 5-90 mol % |
| $K_2O$ | 5-90 mol % |
| $SiO_2$ | 5-90 mol % | in which $SiO_2+Al_2O_3+K_2O>=50$ mol %, preferably greater than 60 mol %, more preferably $>=70$ mol %, still more preferably $>=80$ mol %, or even $>=90$ mol %.

In particular embodiments such fibres comprise,

| | |
|---|---|
| $Al_2O_3$ | 5-34 mol % |
| $K_2O$ | 5-34 mol % |
| $SiO_2$ | 61-90 mol % | or

| | |
|---|---|
| $Al_2O_3$ | 5-78 mol % |
| $K_2O$ | 17-90 mol % |
| $SiO_2$ | 5-61 mol % | or

| | |
|---|---|
| $Al_2O_3$ | 24-90 mol % |
| $K_2O$ | 5-17 mol % |
| $SiO_2$ | 5-61 mol % |

The amount of $K_2O$ may be less than 50 mol %, less than 40 mol %, less than 35 mol % or less than 30 mol %. The amount of $K_2O$ may be greater than 10 mol % or greater than 20 mol %.

The amount of $Al_2O_3$ may be greater than 10 mol %, and may be greater than 20 mol %.

The amount of $SiO_2$ may be greater $>=20$ mol %, $>=30$ mol %, or $>=35$ mol %. The amount of $SiO_2$ may be below 80 mol % or below 70 mol %.

Further features of the invention are apparent from the claims and in the light of the following description.

DETAILED DESCRIPTION OF INVENTION

The inventors produced a range of potassium aluminosilicate fibres using an experimental rig in which a melt was formed of appropriate composition, tapped through an 8-16 mm orifice, and blown to produce fibre in a known manner. (The size of the tap hole was varied to cater for the viscosity of the melt—this is an adjustment that must be determined experimentally according to the apparatus and composition used).

The appended results differ from those shown in the priority application, since it was determined that an insufficient melting temperature for some melts resulted in the presence of carbonate [potassium was supplied as potassium carbonate]. Accordingly the results presented in the following tables represent fresh testing of the materials exemplified in the priority application and further examples.

Table 1 appended hereto shows the fibres made and their compositions in weight percent as determined by x-ray fluorescence analysis.

Table 2 appended hereto shows the fibres made and their calculated compositions in mole percent.

Table 3 appended hereto shows shrinkage of the fibres made. The shrinkage was measured by the method of manufacturing vacuum cast preforms, using 75 g of fibre in 500 cm$^3$ of 0.2% starch solution, into a 120×65 mm tool. Platinum pins (approximately 0.3-0.5 mm diameter) were placed 100× 45 mm apart in the 4 corners. The longest lengths (L1 & L2) and the diagonals (L3 & L4) were measured to an accuracy of ±5 μm using a travelling microscope. The samples were placed in a furnace and ramped to a temperature 50° C. below the test temperature at 300° C./hour and ramped at 120° C./hour for the last 50° C. to test temperature and left for 24 hours. On removal from the furnace the samples were allowed to cool naturally. The shrinkage values are given as an average of the 4 measurements.

Table 4 appended hereto shows solubility of the fibres made in ppm of the major glass components after a 5 hour static test in a pH~4.5 physiological saline solution.

A detailed procedure to measure solubility comprises weighing 0.500 g±0.003 g of fibre into a centrifuge tube using plastic tweezers. The fibre is usually chopped (6# wire mesh) and deshotted (hand sieved with 10# wire), but may be bulk or blanket if only small amounts of fibre are available. Each sample is weighed out in duplicate. 25 cm$^3$ of simulated body fluid is poured into each centrifuge tube using the graduated dispenser and the tubes sealed. The simulated body fluid is only added to the fibre at the start of the test and comprises the following ingredients in 10 litres of water.

| Reagent | Weight |
|---|---|
| NaHCO$_3$ | 19.5 g |
| CaCl$_2$•2H$_2$O | 0.29 g |
| Na$_2$HPO$_4$ | 1.48 g |
| Na$_2$SO$_4$ | 0.79 g |
| MgCl$_2$•6H$_2$O | 2.12 |
| Glycine (H$_2$NCH$_2$CO$_2$H) | 1.18 g |
| Na$_3$citrate•2H$_2$O | 1.52 g |
| Na$_3$tartrate•2H$_2$O | 1.8 g |
| Na pyruvate | 1.72 g |
| 90% lactic acid | 1.56 g |
| Formaldehyde | 15 ml |
| HCl | ~7.5 ml | with the HCl added slowly, as this is an approximate figure for pH adjustment to a final figure of ~4.5 pH. The simulated body fluid is allowed a minimum of 24 hrs to equilibrate and pH is adjusted accordingly after this period.

All of the reagents used are of Analar or equivalent grade and the procedure is carried out using plastic equipment as silica leaching may occur from glassware.

The centrifuge tubes are then placed in a shaking water bath, which is held at 37° C.±1° C. (body temperature) and shaken for 5 hrs. The short time of 5 hours was chosen because the solubility of some of these materials is so high that the amount of K$_2$O leached out can cause the pH to move to higher values, so distorting results, if longer times are used.

After shaking, the two solutions for each fibre are decanted and filtered through Whatman, 110 mm diameter no. 40 ashless filter papers into one 50 ml bottle. The solution is then submitted for Inductively Coupled Plasma Atomic Emission Spectroscopy (ICP). The oxides tested for will depend on the composition of the fibre being tested. The results are reported as ppm of the relevant oxide.

Referring first to fibre properties, it was initially found that when the molar ratio of K$_2$O:SiO$_2$ is less than 30:70 then coarse fibres tend to result with fibre diameters well above loom [e.g. 50-250 μm]. However subsequently this was found to be too sweeping a generalisation and it was realised that fibres with greater than 40 wt % SiO$_2$ [typically more than 52 mol %] were coarse. Such fibres having more than 40 wt % SiO$_2$ and that are made as fine fibres tend to have a relatively high shrinkage since they tend to be prone to viscous flow. Nevertheless such fibres may be of interest in some applications. If fine fibres [<10 μm diameter] are required, then viscosity modifiers may be added. Suitable viscosity modifiers may comprise alkali metal oxides, alkaline earth metal oxides, lanthanide elements, boron oxide, fluoride, and indeed any element or compound known in the art to affect the viscosity of silicate glasses. The amounts and type of such viscosity modifiers should be selected to accord with the end use of the fibres. Boron oxide for example is likely to reduce the maximum use temperature although it may be tolerated [see fibre KAS80]. A viscosity modifier that has been found particularly useful is magnesium, which may be added as the oxide or in other form [see for example fibre KMAS1]. Calcium oxide can be tolerated as may strontium oxide. Zirconium oxide and iron oxide may be tolerated in small amounts. In general, the compositions of the present invention appear tolerant of additives although the amount acceptable to achieve desired properties will vary from additive to additive.

Table 3 shows that that the majority of fibres have a relatively low shrinkage at temperatures from 1000° C. to 1300° C., with many having low shrinkage even as high as 1500° C. It appears that those fibres with too much of an excess of K$_2$O over Al$_2$O$_3$, or too little K$_2$O in relation to Al$_2$O$_3$ show high shrinkages and while usable in applications such as reinforcement or as filler materials in composite articles are not to be recommended for use as high temperature insulation materials.

Close to a 1:1 molar ratio K$_2$O:Al$_2$O$_3$ appears to provide good results and for best high temperature performance [low shrinkage after exposure to 1300° C. for 24 hours] the molar ratio K$_2$O:Al$_2$O$_3$ may be less than 1.6, preferably less than 1.5, more preferably less than 1.45; and may be greater than 0.4, preferably greater than 0.8.

Preferably the fibres of the above mentioned compositions have a melting point of greater than 1400° C. Still more preferably the fibres have a melting point of greater than 1600° C., more preferably greater than 1650° C., and still more preferably greater than 1700° C. (For glasses the melting point is defined as the temperature at which the composition has a viscosity of 10 Pa·s). It can be seen that the composition KMAS1 melts at 1450° C. even though having a relatively low shrinkage at 1400° C. Such a fibre could reasonably be used in insulation applications at temperatures up to, say, 1350° C. while still leaving room for temporary excursions to higher temperatures. In contrast, many of the fibres still show low shrinkage at 1500° C. and would be suitable for higher temperature applications.

It should be noted that at elevated temperatures the fibres may have a tendency to lose potassium. While this may limit the applications to which the fibres may be put, there are many applications for which this is not a problem.

The K$_2$O—Al$_2$O$_3$—SiO$_2$ system contains wide regions of high melting point. For example, as an indication only:—
the mineral composition K$_2$O.Al$_2$O$_3$.2SiO$_2$ (kaliophilite) has a melting point of ~1800° C.
the mineral composition K$_2$O.Al$_2$O$_3$.4SiO$_2$ (leucite) has a melting point of ~1690° C.

In contrast, there are regions where melting points are lower and some eutectics are formed.

For ease of manufacture a composition having a low melting point [e.g. close to or at a eutectic] is to be preferred, whereas for best high temperature performance a composition having a high melting point is to be preferred. The applicants have found that compositions with about 35-40 wt % silica [typically 47-52 mol %] are easy to fiberise and form fibres that show low shrinkage at elevated temperatures. Such fibres with about 23-25 wt % $K_2O$ [typically 18-22 mol %] are particularly easily formed.

The solubility shown in Table 4 indicates that extremely high solubility may be achieved.

Fibres with $K_2O+Al_2O_3+SiO_2>80\%$ and with less than 20 mol % $K_2O$, while showing considerably higher solubility than an aluminosilicate fibre [RCF] do not tend to show such high solubility as calcium magnesium silicate fibres. A good solubility for such fibres is found for $K_2O$ in the range 25 mol % to 30 mol %. For fibres having significant additions of some viscosity modifying additives [e.g. Mg] high solubility may be found [See KMAS1].

For comparison, the total solubility of a commercial calcium-magnesium silicate fibre (which is considered biosoluble in a pH 7.4 simulated physiological solution) and a commercial aluminosilicate fibre (which is not considered biosoluble in a pH 7.4 simulated physiological solution) measured under the same conditions were both ~13 ppm.

While static solubilities are only indicative of biopersistence, these results are strong support for the premise that if inhaled the fibres of the invention would not persist as long as commercial aluminosilicate fibres.

For applications where mechanical resilience is important the fibres may be subjected to a heat treatment. One such application is in pollution control devices such as catalytic converters, diesel particulate filters or traps, exhaust pipes and the like. The demands of such an environment are high and in particular the mats and end cones used need to have sufficient resilience to remain in place after exposure to temperatures of 800° C. or more [typically 900° C. may occur]. Amorphous fibres have been used to make such end cones but tend to lose resilience, and hence their holding pressure against the housing walls, if exposed to temperatures above about 900° C.

By resilience, in this context, is meant the ability of an article to recover its initial shape after deformation. This can be measured by simply looking to the size and shape of an article after deformation to see the extent to which it has returned from the deformed shape towards the undeformed shape. However, in the present context it is most usually measured by looking to the force resisting deformation, since this is an indicator of how well the end cones are likely to stay in place.

WO2004/064996 proposes the use of fibres that are at least partially crystalline or microcrystalline as these are stated to be resistant to shrinkage and more resilient than amorphous fibres, although WO2004/064996 recognises that such crystalline or microcrystalline fibres are more brittle than amorphous fibres. The resilient nature of crystalline or heat treated microcrystalline fibres is well known in the blanket art—see for example WO00/75496 and WO99/46028.

Vitreous fibres such as melt formed silicate fibres are subject of regulation in Europe, and different fibre classes have different hazard classifications and labelling requirements. Conventional vitreous aluminosilicate fibres require more stringent labelling concerning health hazards [as so-called category 2 carcinogens] than do alkaline earth silicate fibres which are exonerated from carcinogen classification.

Directive 97/69/EC which amends Annex 1 of Directive 67/548/EEC and classifies materials as to their potential carcinogenicity (the Hazardous Substances Directive) has two broad chemical categories for silicate fibres of less than 6 μm diameter. These categories and their consequences are:—

| | |
|---|---|
| >18% w/w (CaO, MgO, $Na_2O$, $K_2O$, BaO) | Category 3 - requires product warning label showing St. Andrews Cross and indicating potential harm if inhaled - such fibres may be exonerated from labelling requirements if they meet one or more defined tests of low biopersistence. |
| <18% w/w (CaO, MgO, $Na_2O$, $K_2O$, BaO) | Category 2 - requires product warning label showing skull and crossbones symbol and indicating potential carcinogen if inhaled - cannot be exonerated from labelling requirements |

It will be apparent that the presently claimed class of fibres cover compositions that could fall in Category 3 or Category 2, but advantageously, the amount of $CaO+MgO+Na_2O+K_2O+BaO$ is greater than 18% by weight.

The appended claims limit the fibres to being melt formed fibres. It will be apparent that similar fibres may be capable of manufacture using alternative routes such as sol-gel routes. The present invention also covers such sol-gel fibres provided they comprise 12 mol % or more $K_2O$.

TABLE 1

| Fibre reference | Composition weight percent | | | | | | | | | |
|---|---|---|---|---|---|---|---|---|---|---|
| | CaO | MgO | SrO | $Na_2O$ | $K_2O$ | $Al_2O_3$ | $SiO_2$ | $Fe_2O_3$ | $B_2O_3$ | $ZrO_2$ |
| KAS3 | 0.3 | 0.1 | 0.0 | 0.0 | 21.9 | 25.3 | 51.8 | 0.0 | 0.0 | 0.0 |
| KAS2 | 0.0 | 0.0 | 0.0 | 0.0 | 34.0 | 29.0 | 35.7 | 0.0 | 0.0 | 0.0 |
| KAS4 | 0.0 | 0.0 | 0.0 | 0.0 | 18.5 | 22.0 | 58.7 | 0.0 | 0.0 | 0.0 |
| KAS5 | 0.0 | 0.0 | 0.0 | 0.0 | 33.0 | 18.9 | 45.7 | 0.0 | 0.0 | 0.0 |
| KAS9 | 0.0 | 0.0 | 0.0 | 0.0 | 24.4 | 24.3 | 49.6 | 0.0 | 0.0 | 0.0 |
| KAS10 | 0.0 | 0.0 | 0.0 | 0.0 | 35.5 | 24.5 | 39.3 | 0.0 | 0.0 | 0.0 |
| KAS11 | 0.0 | 0.0 | 0.0 | 0.0 | 37.1 | 22.7 | 37.9 | 0.0 | 0.0 | 0.0 |
| KAS13 | 0.0 | 0.0 | 0.0 | 0.0 | 22.9 | 26.5 | 49.7 | 0.0 | 0.0 | 0.0 |
| KAS14 | 0.0 | 0.0 | 0.0 | 0.0 | 29.8 | 25.7 | 42.8 | 0.0 | 0.0 | 0.0 |
| KAS15 | 0.0 | 0.0 | 0.0 | 0.0 | 37.4 | 26.8 | 33.8 | 0.0 | 0.0 | 0.0 |
| KAS12 | 0.0 | 0.0 | 0.0 | 0.0 | 30.4 | 17.7 | 51.4 | 0.0 | 0.0 | 0.0 |
| KAS17 | 0.0 | 0.0 | 0.0 | 0.0 | 27.1 | 27.0 | 45.2 | 0.0 | 0.0 | 0.0 |
| KNAS1 | 0.0 | 0.0 | 0.0 | 6.7 | 26.2 | 28.4 | 37.9 | 0.0 | 0.0 | 0.0 |
| KMAS1 | 0.0 | 13.9 | 0.0 | 0.0 | 19.8 | 16.1 | 50.0 | 0.0 | 0.0 | 0.0 |
| KNAS2 | 0.0 | 0.0 | 0.0 | 6.8 | 24.1 | 29.2 | 39.3 | 0.0 | 0.0 | 0.0 |
| KAS18 | 0.0 | 0.0 | 0.0 | 0.0 | 23.8 | 15.3 | 60.4 | 0.0 | 0.0 | 0.0 |

TABLE 1-continued

| Fibre reference | Composition weight percent | | | | | | | | | |
|---|---|---|---|---|---|---|---|---|---|---|
| | CaO | MgO | SrO | Na$_2$O | K$_2$O | Al$_2$O$_3$ | SiO$_2$ | Fe$_2$O$_3$ | B$_2$O$_3$ | ZrO$_2$ |
| KAS25 | 0.0 | 0.0 | 0.0 | 0.0 | 35.6 | 35.9 | 26.3 | 0.0 | 0.0 | 0.0 |
| KAS27 | 0.0 | 0.0 | 0.0 | 0.2 | 37.1 | 31.3 | 31.3 | 0.0 | 0.0 | 0.0 |
| KAS28 | 0.0 | 0.0 | 0.0 | 0.0 | 32.5 | 34.6 | 31.1 | 0.0 | 0.0 | 0.0 |
| KAS29 | 0.0 | 0.0 | 0.0 | 0.0 | 34.5 | 28.8 | 36.7 | 0.0 | 0.0 | 0.0 |
| KAS30 | 0.0 | 0.0 | 0.0 | 0.0 | 25.6 | 36.3 | 35.9 | 0.0 | 0.0 | 0.0 |
| KAS31 | 0.0 | 0.0 | 0.0 | 0.0 | 20.6 | 40.1 | 37.5 | 0.0 | 0.0 | 0.0 |
| KAS32 | 0.0 | 0.0 | 0.0 | 0.0 | 25.3 | 32.3 | 41.4 | 0.0 | 0.0 | 0.0 |
| KAS33 | 0.0 | 0.0 | 0.0 | 0.0 | 17.4 | 36.7 | 45.4 | 0.0 | 0.0 | 0.0 |
| KAS34 | 0.0 | 0.0 | 0.0 | 0.0 | 20.7 | 31.1 | 46.2 | 0.0 | 0.0 | 0.0 |
| KAS35 | 0.0 | 0.0 | 0.0 | 0.0 | 15.1 | 34.9 | 48.5 | 0.0 | 0.0 | 0.0 |
| KAS36 | 0.0 | 0.0 | 0.0 | 0.0 | 14.9 | 31.6 | 52.3 | 0.0 | 0.0 | 0.0 |
| KAS37 | 0.0 | 0.0 | 0.0 | 0.0 | 31.8 | 29.4 | 39.2 | 0.0 | 0.0 | 0.0 |
| KAS40 | 0.0 | 0.0 | 0.0 | 0.1 | 21.4 | 20.3 | 57.2 | 0.0 | 0.0 | 0.0 |
| KMAS3 | 0.0 | 5.1 | 0.0 | 0.0 | 19.4 | 19.7 | 55.5 | 0.0 | 0.0 | 0.0 |
| KAS41 | 0.0 | 0.0 | 0.0 | 0.1 | 33.8 | 37.1 | 27.5 | 0.0 | 0.0 | 0.0 |
| KAS43 | 0.0 | 0.0 | 0.0 | 0.0 | 23.7 | 24.0 | 50.7 | 0.0 | 0.0 | 0.0 |
| KAS44 | 0.0 | 0.0 | 0.0 | 0.0 | 28.5 | 31.3 | 40.7 | 0.0 | 0.0 | 0.0 |
| KAS45 | 0.0 | 0.0 | 0.0 | 0.0 | 28.0 | 27.5 | 44.5 | 0.0 | 0.0 | 0.0 |
| KAS46 | 0.0 | 0.0 | 0.0 | 0.0 | 27.7 | 28.3 | 43.2 | 0.0 | 0.0 | 0.0 |
| KAS47 | 0.0 | 0.0 | 0.0 | 0.0 | 25.1 | 24.8 | 49.4 | 0.0 | 0.0 | 0.0 |
| KMAS4 | 0.1 | 5.4 | 0.0 | 0.1 | 16.6 | 19.4 | 57.1 | 0.0 | 0.0 | 0.0 |
| KAS50 | 0.0 | 0.0 | 0.0 | 0.1 | 34.4 | 35.5 | 29.6 | 0.0 | 0.0 | 0.0 |
| KAS51 | 0.0 | 0.1 | 0.0 | 0.1 | 33.7 | 41.7 | 23.4 | 0.0 | 0.0 | 0.0 |
| KAS52 | 0.0 | 0.0 | 0.0 | 0.1 | 43.2 | 26.0 | 31.3 | 0.0 | 0.0 | 0.0 |
| KAS53 | 0.0 | 0.0 | 0.0 | 0.1 | 29.8 | 42.6 | 26.7 | 0.0 | 0.0 | 0.0 |
| KAS54 | 0.0 | 0.0 | 0.0 | 0.1 | 22.5 | 42.9 | 33.9 | 0.0 | 0.0 | 0.0 |
| KAS55 | 0.0 | 0.0 | 0.0 | 0.2 | 25.3 | 39.9 | 33.3 | 0.0 | 0.0 | 0.0 |
| KAS56 | 0.2 | 0.1 | 0.0 | 0.2 | 17.8 | 48.8 | 32.5 | 0.0 | 0.0 | 0.0 |
| KSAS1 | 0.0 | 0.0 | 2.4 | 0.2 | 24.8 | 30.3 | 41.9 | 0.0 | 0.0 | 0.0 |
| KCAS1 | 2.3 | 0.1 | 0.0 | 0.1 | 27.5 | 27.2 | 42.0 | 0.0 | 0.0 | 0.0 |
| KMAS6 | 0.0 | 2.8 | 0.0 | 0.2 | 24.3 | 30.1 | 40.7 | 0.0 | 0.0 | 0.0 |
| KAS48 | 0.0 | 0.1 | 0.0 | 0.1 | 30.5 | 32.8 | 35.9 | 0.0 | 0.0 | 0.0 |
| KAS59 | 0.3 | 0.1 | 0.0 | 0.2 | 20.0 | 45.3 | 32.5 | 0.1 | 0.0 | 0.0 |
| KCAS2 | 2.7 | 0.1 | 0.0 | 0.1 | 20.4 | 34.0 | 40.9 | 0.0 | 0.0 | 0.0 |
| KSAS2 | 0.1 | 0.1 | 2.9 | 0.2 | 21.4 | 37.6 | 37.1 | 0.0 | 0.0 | 0.0 |
| KAS60 | 0.0 | 0.0 | 0.0 | 0.7 | 18.1 | 37.8 | 42.3 | 0.0 | 0.0 | 0.0 |
| KAS61 | 0.0 | 0.1 | 0.0 | 0.2 | 15.9 | 35.1 | 46.5 | 0.1 | 0.0 | 0.0 |
| KAS62 | 0.0 | 0.1 | 0.0 | 0.2 | 32.0 | 45.8 | 21.1 | 0.1 | 0.0 | 0.0 |
| KAS63 | 0.0 | 0.1 | 0.0 | 0.2 | 24.6 | 55.0 | 17.9 | 0.0 | 0.0 | 0.0 |
| KAS65 | 0.0 | 0.1 | 0.0 | 0.2 | 24.1 | 43.0 | 31.5 | 0.1 | 0.0 | 0.0 |
| KACaSrS02 | 2.4 | 0.1 | 2.2 | 0.2 | 24.6 | 28.9 | 39.0 | 0.0 | 0.0 | 0.0 |
| KAMgSrS02 | 0.1 | 2.5 | 2.3 | 0.2 | 24.2 | 31.1 | 39.6 | 0.0 | 0.0 | 0.0 |
| KAS63 | 0.0 | 0.1 | 0.0 | 0.2 | 28.5 | 50.6 | 21.4 | 0.0 | 0.0 | 0.0 |
| KAS64 | 0.0 | 0.1 | 0.0 | 0.2 | 24.2 | 52.9 | 22.7 | 0.0 | 0.0 | 0.0 |
| KAS66 | 0.0 | 0.1 | 0.0 | 0.2 | 18.0 | 45.3 | 35.2 | 0.0 | 0.0 | 0.0 |
| KAS67 | 0.3 | 0.0 | 0.0 | 0.1 | 21.6 | 29.3 | 49.4 | 0.0 | 0.0 | 0.1 |
| KAS68 | 0.2 | 0.0 | 0.0 | 0.2 | 32.3 | 54.9 | 13.2 | 0.0 | 0.0 | 0.1 |
| KAS69 | 0.0 | 0.0 | 0.0 | 0.2 | 31.7 | 53.5 | 15.6 | 0.0 | 0.0 | 0.1 |
| KAS70 | 0.0 | 0.0 | 0.0 | 0.2 | 30.7 | 58.9 | 11.7 | 0.0 | 0.0 | 0.1 |
| KAS71 | 0.0 | 0.0 | 0.0 | 0.3 | 28.7 | 55.9 | 16.1 | 0.0 | 0.0 | 0.1 |
| KAS72 | 0.0 | 0.0 | 0.0 | 0.3 | 28.4 | 58.8 | 12.4 | 0.0 | 0.0 | 0.1 |
| KAS73 | 0.0 | 0.0 | 0.0 | 0.2 | 23.6 | 58.2 | 17.8 | 0.0 | 0.0 | 0.1 |
| KAS74 | 0.0 | 0.0 | 0.0 | 0.3 | 24.1 | 61.7 | 13.4 | 0.0 | 0.0 | 0.1 |
| KAS75 | 0.0 | 0.0 | 0.0 | 0.3 | 33.1 | 52.4 | 16.3 | 0.0 | 0.0 | 0.1 |
| KAS76 | 0.0 | 0.0 | 0.8 | 0.2 | 21.0 | 29.0 | 48.6 | 0.0 | 0.0 | 0.1 |
| KAS77 | 0.9 | 0.0 | 0.0 | 0.2 | 22.1 | 28.2 | 49.1 | 0.1 | 0.0 | 0.1 |
| KAS78 | 0.0 | 1.0 | 0.0 | 0.2 | 21.1 | 27.8 | 49.0 | 0.1 | 0.0 | 0.1 |
| KAS79 | 0.0 | 0.0 | 0.0 | 0.8 | 22.5 | 29.2 | 48.1 | 0.1 | 0.0 | 0.1 |
| KAS80 | 0.0 | 0.0 | 0.0 | 0.2 | 22.9 | 29.7 | 47.3 | 0.0 | 0.7 | 0.1 |
| KAS81 | 0.5 | 0.1 | 0.0 | 0.2 | 21.2 | 28.7 | 49.4 | 0.0 | 0.0 | 0.1 |
| KAS82 | 0.0 | 0.2 | 0.4 | 0.2 | 20.7 | 30.0 | 48.4 | 0.0 | 0.0 | 0.1 |
| KAS83 | 0.5 | 0.1 | 0.8 | 0.2 | 20.7 | 29.0 | 48.2 | 0.0 | 0.0 | 0.1 |
| KAS84 | 0.5 | 0.1 | 0.5 | 0.2 | 21.2 | 30.2 | 47.1 | 0.0 | 0.0 | 0.1 |
| KAS85 | 1.0 | 0.1 | 0.5 | 0.2 | 21.3 | 30.2 | 47.0 | 0.1 | 0.0 | 0.1 |
| KAS76-2 | 0.1 | 0.3 | 0.9 | 0.2 | 20.7 | 30.1 | 47.1 | 0.0 | 0.0 | 0.1 |
| KAS77-2 | 1.0 | 0.1 | 0.0 | 0.2 | 21.1 | 30.7 | 47.0 | 0.0 | 0.0 | 0.1 |
| KAS 76-3 | 0.0 | 0.1 | 0.9 | 0.3 | 21.2 | 29.2 | 48.3 | 0.0 | 0.0 | 0.1 |
| KAS82-2 | 0.1 | 0.1 | 0.4 | 0.1 | 20.4 | 28.5 | 50.4 | 0.1 | 0.0 | 0.1 |
| KAS86 | 1.0 | 0.1 | 0.9 | 0.2 | 20.7 | 30.2 | 46.8 | 0.1 | 0.0 | 0.1 |

TABLE 2

| Fibre reference | Composition mol percent | | | | | | | | | |
|---|---|---|---|---|---|---|---|---|---|---|
| | CaO | MgO | SrO | Na₂O | K₂O | Al₂O₃ | SiO₂ | Fe₂O₃ | B₂O₃ | ZrO₂ |
| KAS3 | 0.4% | 0.2% | 0.0% | 0.0% | 17.2% | 18.4% | 63.8% | 0.0% | 0.0% | 0.0% |
| KAS2 | 0.0% | 0.0% | 0.0% | 0.0% | 29.1% | 23.0% | 47.9% | 0.0% | 0.0% | 0.0% |
| KAS4 | 0.0% | 0.0% | 0.0% | 0.0% | 14.1% | 15.5% | 70.3% | 0.0% | 0.0% | 0.0% |
| KAS5 | 0.0% | 0.0% | 0.0% | 0.0% | 27.0% | 14.3% | 58.7% | 0.0% | 0.0% | 0.0% |
| KAS9 | 0.0% | 0.0% | 0.0% | 0.0% | 19.6% | 18.0% | 62.4% | 0.0% | 0.0% | 0.0% |
| KAS10 | 0.0% | 0.0% | 0.0% | 0.0% | 29.6% | 18.9% | 51.5% | 0.0% | 0.0% | 0.0% |
| KAS11 | 0.0% | 0.0% | 0.0% | 0.0% | 31.6% | 17.8% | 50.6% | 0.0% | 0.0% | 0.0% |
| KAS13 | 0.0% | 0.0% | 0.0% | 0.0% | 18.3% | 19.5% | 62.2% | 0.0% | 0.0% | 0.0% |
| KAS14 | 0.0% | 0.0% | 0.0% | 0.0% | 24.7% | 19.7% | 55.6% | 0.0% | 0.0% | 0.0% |
| KAS15 | 0.0% | 0.0% | 0.0% | 0.0% | 32.5% | 21.5% | 46.0% | 0.0% | 0.0% | 0.0% |
| KAS12 | 0.0% | 0.0% | 0.0% | 0.0% | 23.9% | 12.8% | 63.3% | 0.0% | 0.0% | 0.0% |
| KAS17 | 0.0% | 0.0% | 0.0% | 0.0% | 22.0% | 20.3% | 57.7% | 0.0% | 0.0% | 0.0% |
| KNAS1 | 0.0% | 0.0% | 0.0% | 8.3% | 21.5% | 21.5% | 48.7% | 0.0% | 0.0% | 0.0% |
| KMAS1 | 0.0% | 22.3% | 0.0% | 0.0% | 13.6% | 10.2% | 53.9% | 0.0% | 0.0% | 0.0% |
| KNAS2 | 0.0% | 0.0% | 0.0% | 8.4% | 19.6% | 21.9% | 50.1% | 0.0% | 0.0% | 0.0% |
| KAS18 | 0.0% | 0.0% | 0.0% | 0.0% | 17.9% | 10.7% | 71.4% | 0.0% | 0.0% | 0.0% |
| KAS25 | 0.0% | 0.0% | 0.0% | 0.0% | 32.4% | 30.2% | 37.5% | 0.0% | 0.0% | 0.0% |
| KAS27 | 0.0% | 0.0% | 0.0% | 0.3% | 32.1% | 25.1% | 42.5% | 0.0% | 0.0% | 0.0% |
| KAS28 | 0.0% | 0.0% | 0.0% | 0.0% | 28.7% | 28.2% | 43.1% | 0.0% | 0.0% | 0.0% |
| KAS29 | 0.0% | 0.0% | 0.0% | 0.0% | 29.1% | 22.4% | 48.5% | 0.0% | 0.0% | 0.0% |
| KAS30 | 0.0% | 0.0% | 0.0% | 0.0% | 22.2% | 29.1% | 48.8% | 0.0% | 0.0% | 0.0% |
| KAS31 | 0.0% | 0.0% | 0.0% | 0.0% | 17.7% | 31.8% | 50.5% | 0.0% | 0.0% | 0.0% |
| KAS32 | 0.0% | 0.0% | 0.0% | 0.0% | 21.1% | 24.9% | 54.1% | 0.0% | 0.0% | 0.0% |
| KAS33 | 0.0% | 0.0% | 0.0% | 0.0% | 14.2% | 27.6% | 57.9% | 0.0% | 0.0% | 0.0% |
| KAS34 | 0.0% | 0.0% | 0.0% | 0.0% | 17.0% | 23.6% | 59.4% | 0.0% | 0.0% | 0.0% |
| KAS35 | 0.0% | 0.0% | 0.0% | 0.0% | 12.2% | 26.1% | 61.6% | 0.0% | 0.0% | 0.0% |
| KAS36 | 0.0% | 0.0% | 0.0% | 0.0% | 11.8% | 23.2% | 65.0% | 0.0% | 0.0% | 0.0% |
| KAS37 | 0.0% | 0.0% | 0.0% | 0.0% | 26.4% | 22.6% | 51.0% | 0.0% | 0.0% | 0.0% |
| KAS40 | 0.0% | 0.0% | 0.0% | 0.1% | 16.5% | 14.4% | 69.0% | 0.0% | 0.0% | 0.0% |
| KMAS3 | 0.0% | 8.7% | 0.0% | 0.0% | 14.2% | 13.3% | 63.7% | 0.0% | 0.0% | 0.0% |
| KAS41 | 0.0% | 0.0% | 0.0% | 0.1% | 30.4% | 30.8% | 38.7% | 0.0% | 0.0% | 0.0% |
| KAS43 | 0.0% | 0.0% | 0.0% | 0.0% | 18.9% | 17.7% | 63.4% | 0.0% | 0.0% | 0.0% |
| KAS44 | 0.0% | 0.0% | 0.0% | 0.0% | 23.5% | 23.9% | 52.6% | 0.0% | 0.0% | 0.0% |
| KAS45 | 0.0% | 0.0% | 0.0% | 0.0% | 22.7% | 20.6% | 56.6% | 0.0% | 0.0% | 0.0% |
| KAS46 | 0.0% | 0.0% | 0.0% | 0.0% | 22.8% | 21.5% | 55.7% | 0.0% | 0.0% | 0.0% |
| KAS47 | 0.0% | 0.0% | 0.0% | 0.0% | 20.0% | 18.3% | 61.7% | 0.0% | 0.0% | 0.0% |
| KMAS4 | 0.1% | 9.2% | 0.0% | 0.1% | 12.1% | 13.1% | 65.4% | 0.0% | 0.0% | 0.0% |
| KAS50 | 0.0% | 0.0% | 0.0% | 0.1% | 30.2% | 28.8% | 40.8% | 0.0% | 0.0% | 0.0% |
| KAS51 | 0.0% | 0.2% | 0.0% | 0.1% | 30.8% | 35.2% | 33.6% | 0.0% | 0.0% | 0.0% |
| KAS52 | 0.0% | 0.0% | 0.0% | 0.1% | 37.1% | 20.6% | 42.1% | 0.0% | 0.0% | 0.0% |
| KAS53 | 0.0% | 0.0% | 0.0% | 0.1% | 26.8% | 35.4% | 37.7% | 0.0% | 0.0% | 0.0% |
| KAS54 | 0.0% | 0.0% | 0.0% | 0.1% | 19.5% | 34.3% | 46.0% | 0.0% | 0.0% | 0.0% |
| KAS55 | 0.0% | 0.0% | 0.0% | 0.3% | 22.1% | 32.1% | 45.5% | 0.0% | 0.0% | 0.0% |
| KAS56 | 0.3% | 0.2% | 0.0% | 0.3% | 15.5% | 39.3% | 44.4% | 0.0% | 0.0% | 0.0% |
| KSAS1 | 0.0% | 0.0% | 1.8% | 0.3% | 20.5% | 23.1% | 54.3% | 0.0% | 0.0% | 0.0% |
| KCAS1 | 3.1% | 0.2% | 0.0% | 0.1% | 22.4% | 20.5% | 53.7% | 0.0% | 0.0% | 0.0% |
| KMAS6 | 0.0% | 5.3% | 0.0% | 0.2% | 19.8% | 22.7% | 52.0% | 0.0% | 0.0% | 0.0% |
| KAS48 | 0.0% | 0.2% | 0.0% | 0.1% | 26.0% | 25.8% | 47.9% | 0.0% | 0.0% | 0.0% |
| KAS59 | 0.4% | 0.2% | 0.0% | 0.3% | 17.6% | 36.7% | 44.7% | 0.1% | 0.0% | 0.0% |
| KCAS2 | 3.8% | 0.2% | 0.0% | 0.1% | 16.9% | 26.0% | 53.1% | 0.0% | 0.0% | 0.0% |
| KSAS2 | 0.1% | 0.2% | 2.2% | 0.3% | 18.2% | 29.5% | 49.4% | 0.0% | 0.0% | 0.0% |
| KAS60 | 0.0% | 0.0% | 0.0% | 0.9% | 15.0% | 29.0% | 55.1% | 0.0% | 0.0% | 0.0% |
| KAS61 | 0.0% | 0.1% | 0.0% | 0.2% | 13.1% | 26.6% | 59.9% | 0.0% | 0.0% | 0.0% |
| KAS62 | 0.0% | 0.1% | 0.0% | 0.3% | 29.6% | 39.2% | 30.6% | 0.1% | 0.0% | 0.0% |
| KAS63 | 0.0% | 0.1% | 0.0% | 0.3% | 23.7% | 48.9% | 27.0% | 0.0% | 0.0% | 0.0% |
| KAS65 | 0.0% | 0.1% | 0.0% | 0.3% | 21.2% | 35.0% | 43.5% | 0.1% | 0.0% | 0.0% |
| KACaSrS02 | 3.4% | 0.2% | 1.7% | 0.3% | 20.7% | 22.4% | 51.4% | 0.0% | 0.0% | 0.0% |
| KAMgSrS02 | 0.1% | 4.8% | 1.7% | 0.2% | 19.6% | 23.3% | 50.3% | 0.0% | 0.0% | 0.0% |
| KAS63 | 0.0% | 0.2% | 0.0% | 0.3% | 26.1% | 42.8% | 30.7% | 0.0% | 0.0% | 0.0% |
| KAS64 | 0.0% | 0.2% | 0.0% | 0.3% | 22.2% | 44.8% | 32.6% | 0.0% | 0.0% | 0.0% |
| KAS66 | 0.0% | 0.2% | 0.0% | 0.3% | 15.6% | 36.2% | 47.7% | 0.0% | 0.0% | 0.0% |
| KAS67 | 0.4% | 0.0% | 0.0% | 0.1% | 17.0% | 21.3% | 61.1% | 0.0% | 0.0% | 0.1% |
| KAS68 | 0.3% | 0.0% | 0.0% | 0.3% | 30.9% | 48.6% | 19.8% | 0.0% | 0.0% | 0.1% |
| KAS69 | 0.0% | 0.0% | 0.0% | 0.3% | 29.9% | 46.6% | 23.1% | 0.0% | 0.0% | 0.1% |
| KAS70 | 0.0% | 0.0% | 0.0% | 0.3% | 29.6% | 52.4% | 17.7% | 0.0% | 0.0% | 0.1% |
| KAS71 | 0.0% | 0.0% | 0.0% | 0.4% | 27.0% | 48.7% | 23.8% | 0.0% | 0.0% | 0.1% |
| KAS72 | 0.0% | 0.0% | 0.0% | 0.4% | 27.7% | 52.9% | 18.9% | 0.0% | 0.0% | 0.1% |
| KAS73 | 0.0% | 0.0% | 0.0% | 0.3% | 22.3% | 50.9% | 26.4% | 0.0% | 0.0% | 0.1% |
| KAS74 | 0.0% | 0.0% | 0.0% | 0.4% | 23.5% | 55.5% | 20.5% | 0.0% | 0.0% | 0.1% |
| KAS75 | 0.0% | 0.0% | 0.0% | 0.4% | 30.8% | 45.0% | 23.8% | 0.0% | 0.0% | 0.1% |
| KAS76 | 0.0% | 0.0% | 0.0% | 0.6% | 16.8% | 21.4% | 60.9% | 0.0% | 0.0% | 0.1% |
| KAS77 | 1.2% | 0.0% | 0.0% | 0.2% | 17.4% | 20.5% | 60.6% | 0.0% | 0.0% | 0.1% |
| KAS78 | 0.0% | 1.8% | 0.0% | 0.2% | 16.7% | 20.3% | 60.8% | 0.0% | 0.0% | 0.1% |
| KAS79 | 0.0% | 0.0% | 0.0% | 1.0% | 17.8% | 21.4% | 59.7% | 0.0% | 0.0% | 0.1% |
| KAS80 | 0.0% | 0.0% | 0.0% | 0.2% | 18.2% | 21.8% | 58.9% | 0.0% | 0.8% | 0.1% |
| KAS81 | 0.7% | 0.2% | 0.0% | 0.2% | 16.7% | 20.9% | 61.2% | 0.0% | 0.0% | 0.1% |

TABLE 2-continued

| Fibre reference | Composition mol percent | | | | | | | | | |
|---|---|---|---|---|---|---|---|---|---|---|
| | CaO | MgO | SrO | Na₂O | K₂O | Al₂O₃ | SiO₂ | Fe₂O₃ | B₂O₃ | ZrO₂ |
| KAS82 | 0.0% | 0.4% | 0.3% | 0.2% | 16.5% | 22.1% | 60.5% | 0.0% | 0.0% | 0.1% |
| KAS83 | 0.7% | 0.2% | 0.6% | 0.2% | 16.5% | 21.4% | 60.3% | 0.0% | 0.0% | 0.1% |
| KAS84 | 0.7% | 0.2% | 0.4% | 0.2% | 17.0% | 22.3% | 59.1% | 0.0% | 0.0% | 0.1% |
| KAS85 | 1.3% | 0.2% | 0.4% | 0.2% | 16.9% | 22.2% | 58.6% | 0.0% | 0.0% | 0.1% |
| KAS76-2 | 0.1% | 0.6% | 0.7% | 0.2% | 16.6% | 22.4% | 59.3% | 0.0% | 0.0% | 0.1% |
| KAS77-2 | 1.3% | 0.2% | 0.0% | 0.2% | 16.8% | 22.6% | 58.7% | 0.0% | 0.0% | 0.1% |
| KAS 76-3 | 0.0% | 0.2% | 0.7% | 0.4% | 16.9% | 21.5% | 60.3% | 0.0% | 0.0% | 0.1% |
| KAS82-2 | 0.1% | 0.2% | 0.3% | 0.1% | 16.1% | 20.8% | 62.3% | 0.0% | 0.0% | 0.1% |
| KAS86 | 1.3% | 0.2% | 0.7% | 0.2% | 16.5% | 22.3% | 58.6% | 0.0% | 0.0% | 0.1% |

TABLE 3

| Fibre reference | Shrinkage % at specified temperature ° C. for 24 hours | | | | | |
|---|---|---|---|---|---|---|
| | 1000 | 1100 | 1200 | 1300 | 1400 | 1500 |
| KAS3 | | | | 2.3 | 2.5 | 2.9 |
| KAS2 | | | | 1.6 | 1.7 | 2.3 |
| KAS4 | | | | 0.9 | 1.0 | 0.4 |
| KAS5 | 18.5 | | | 17.0 | | |
| KAS9 | | | | 1.4 | 1.5 | 1.2 |
| KAS10 | | | | 3.6 | 3.7 | 3.6 |
| KAS11 | 2.4 | 0.0 | 5.4 | 6.3 | 7.0 | 6.8 |
| KAS13 | | | | 0.8 | 1.1 | 1.4 |
| KAS14 | 0.4 | | | 1.1 | 1.1 | 1.2 |
| KAS15 | 2.9 | | | 2.6 | 2.6 | 2.8 |
| KAS12 | 19.8 | | | 19.3 | | |
| KAS17 | | | | 0.8 | 1.1 | 1.4 |
| KNAS1 | 2.1 | 3.4 | 4.3 | | | |
| KMAS1 | 2.5 | 2.1 | 2.2 | 2.9 | 3.2 | Melt at 1450 |
| KNAS2 | 1.6 | 2.2 | 2.5 | 4.5 | 4.4 | |
| KAS18 | 11.0 | | | 10.9 | | |
| KAS25 | 0.9 | 1.4 | 1.7 | 1.5 | 3.9 | 5.0 |
| KAS27 | 1.9 | 2 | 2.1 | 2.2 | 2.8 | 2.8 |
| KAS28 | 1.5 | 1.4 | 1.4 | 1.8 | 3.0 | 3.3 |
| KAS29 | 1.7 | 1.9 | 1.9 | 1.8 | 1.8 | 1.9 |
| KAS30 | 1.4 | 1.5 | 1.5 | 1.1 | 1.2 | 1.0 |
| KAS31 | 2.3 | 2.4 | 2.7 | 3.7 | 3.8 | 3.8 |
| KAS32 | 1.9 | 1.9 | 1.7 | 2.0 | 2.1 | 2.3 |
| KAS33 | 2.1 | 2.1 | 2.3 | 1.9 | 1.9 | 2.0 |
| KAS34 | 1.6 | 2.4 | 2.5 | 3.7 | 3.8 | 3.8 |
| KAS35 | 2.6 | 5.4 | | 9.7 | | |
| KAS36 | 3.8 | 4.1 | | 5.2 | | |
| KAS37 | | | | 1.5 | 1.6 | |
| KAS40 | | | | 0.5 | 0.5 | |
| KMAS3 | 1.4 | 1.2 | 0.8 | 1.7 | 1.8 | Melted |
| KAS41 | | | | 4.6 | | |
| KAS43 | | | | 0.0 | 0.0 | |
| KAS44 | 0.6 | 0.0 | 0.0 | 0.4 | 0.0 | 0.0 |
| KAS45 | 0.7 | | 0.6 | 1.3 | | 1.2 |
| KAS46 | | | | 1.4 | 0.0 | |
| KAS47 | | | | 1.2 | 0.0 | |
| KMAS4 | | | | 3.7 | Melted | |
| KAS50 | 1.4 | 1.6 | 1.8 | 2.0 | 3.0 | 3.9 |
| KAS51 | 0.4 | 0.5 | 1.1 | 3.0 | 4.2 | 5.3 |
| KAS52 | 1.0 | 0.7 | 0.1 | 1.3 | 1.0 | 0.3 |
| KAS53 | | | 1.7 | | 3.3 | 3.8 |
| KAS54 | | | 1.8 | | 1.9 | 2.0 |
| KAS55 | | | 1.7 | | 2.4 | 3.1 |
| KAS56 | 1.5 | 2.0 | | 2.8 | 3.3 | |
| KSAS1 | 0.0 | 0.0 | 0.0 | 0.6 | 0.0 | 0.5 |
| KCAS1 | | 0.8 | | | 1.1 | 1.9 |
| KMAS6 | | 0.4 | | | 1.4 | 4.1 |
| KAS48 | 1.7 | 1.8 | 2.0 | 2.1 | 2.3 | 3.1 |
| KAS59 | 2.4 | 2.5 | | 3.0 | 4.9 | |
| KCAS2 | | | | 2.5 | 2.4 | Melted |
| KSAS2 | 1.7 | 1.7 | | 1.9 | 2.1 | 10.4 |
| KAS60 | 2.5 | 2.5 | 2.6 | 3.8 | 3.9 | 3.5 |
| KAS61 | 1.8 | 2.3 | 2.8 | 2.6 | 2.7 | 2.0 |
| KAS62 | 0.6 | 0.6 | 0.7 | 2.3 | 3.8 | 5.3 |
| KAS63 | 1.0 | 1.2 | 1.8 | 2.5 | 2.8 | 3.7 |
| KAS65 | 2.0 | 1.8 | 1.8 | 1.7 | 2.3 | 2.7 |
| KACaSrS02 | 1.3 | 1.0 | 1.0 | 1.0 | 4.4 | |
| KAMgSrS02 | 1.0 | 1.0 | 0.9 | 1.9 | 4.9 | Melted |
| KAS63 | 1.3 | 1.4 | 1.8 | 2.5 | 3.8 | 4.7 |
| KAS64 | 2.5 | 2.7 | 3.3 | 3.7 | 4.0 | 6.0 |
| KAS66 | 1.8 | 1.9 | 2.4 | 2.6 | 2.9 | 2.6 |
| KAS67 | 0.7 | 1.8 | 1.7 | 1.8 | 1.2 | 1.4 |
| KAS68 | 6.6 | | | | | |
| KAS69 | 6.0 | | | 7.2 | | |
| KAS70 | 6.6 | | | | | |
| KAS71 | 4.7 | | | 6.6 | | |
| KAS72 | 6.5 | | | 8.5 | | |
| KAS73 | 1.5 | 1.7 | 2.4 | 2.7 | 3.6 | 7.1 |
| KAS74 | 5.6 | | | | | |
| KAS75 | 6.5 | | | 8.2 | | |
| KAS76 | 0.2 | 2.3 | 1.2 | 1.2 | 1.2 | 1.3 |
| KAS77 | 0.6 | 2.7 | 2.7 | 2.8 | 2.8 | 4.1 |
| KAS78 | 3.6 | 3.7 | 3.8 | 3.8 | 3.9 | 4.1 |
| KAS79 | 0.0 | 1.1 | 1.2 | 1.3 | 1.3 | 1.3 |
| KAS80 | 0.0 | 0.3 | 0.2 | 0.2 | 0.1 | 0.2 |
| KAS81 | 0.0 | 1.0 | 1.0 | 1.1 | 1.2 | |
| KAS82 | 4.0 | | | | | |
| KAS83 | 2.7 | 3.9 | 3.8 | 3.9 | 4.0 | |
| KAS84 | 0.0 | 0.9 | 0.8 | 1.0 | 1.0 | |
| KAS85 | 4.9 | | | | | |
| KAS76-2 | | | | | 6.2 | |
| KAS77-2 | | | | 0.4 | 0.4 | 0.6 |
| KAS 76-3 | | | | 10.7 | | |
| KAS82-2 | | | | 16.2 | | |
| KAS86 | | | | 15.1 | | |

TABLE 4

| Fibre reference | Solubility ppm | | | | | | |
|---|---|---|---|---|---|---|---|
| | Al₂O₃ | CaO | Fe₂O₃ | MgO | SiO₂ | K₂O | Total |
| KAS3 | 0 | 0 | 0 | 0 | 3 | 37 | 40 |
| KAS2 | 7 | 0 | 0 | 0 | 9 | 202 | 218 |
| KAS4 | 1 | 0 | 0 | 0 | 1 | 17 | 19 |
| KAS5 | 0 | 0 | 0 | 0 | 3 | 356 | 359 |
| KAS9 | 3 | 0 | 0 | 0 | 2 | 47 | 52 |
| KAS10 | 2 | 0 | 0 | 0 | 2 | 460 | 464 |
| KAS11 | 0 | 0 | 0 | 0 | 14 | 400 | 414 |
| KAS13 | 1 | 0 | 0 | 0 | 2 | 10 | 13 |
| KAS14 | 0 | 0 | 0 | 0 | 2 | 101 | 103 |
| KAS15 | 1 | 0 | 0 | 0 | 3 | 265 | 269 |
| KAS12 | 0 | 0 | 0 | 0 | 14 | 216 | 230 |
| KAS17 | 2 | 0 | 0 | 0 | 4 | 44 | 50 |
| KNAS1 | 5 | 0 | 0 | 0 | 6 | 150 | 161 |
| KMAS1 | 1 | 0 | 0 | 0 | 3 | 323 | 327 |
| KNAS2 | 6 | 0 | 0 | 0 | 11 | 74 | 91 |
| KAS18 | 2 | 0 | 0 | 0 | 1 | 12 | 15 |
| KAS25 | 6 | 0 | 0 | 0 | 8 | 351 | 365 |
| KAS27 | 4 | 0 | 0 | 0 | 5 | 303 | 312 |
| KAS28 | 12 | 0 | 0 | 0 | 11 | 168 | 191 |

TABLE 4-continued

| Fibre reference | Solubility ppm | | | | | | |
|---|---|---|---|---|---|---|---|
| | Al₂O₃ | CaO | Fe₂O₃ | MgO | SiO₂ | K₂O | Total |
| KAS29 | 6 | 0 | 0 | 0 | 7 | 255 | 268 |
| KAS30 | 15 | 0 | 0 | 0 | 15 | 97 | 127 |
| KAS31 | 11 | 0 | 0 | 0 | 8 | 52 | 71 |
| KAS32 | 5 | 0 | 0 | 0 | 6 | 72 | 83 |
| KAS33 | 3 | 0 | 0 | 0 | 3 | 334 | 340 |
| KAS34 | 2 | 0 | 0 | 0 | 2 | 154 | 158 |
| KAS35 | 4 | 0 | 0 | 0 | 3 | 61 | 68 |
| KAS36 | 4 | 0 | 0 | 0 | 3 | 28 | 35 |
| KAS37 | 5 | 0 | 0 | 0 | 6 | 61 | 72 |
| KAS40 | 1 | 0 | 0 | 0 | 1 | 8 | 10 |
| KMAS3 | 1 | 0 | 0 | 3 | 0 | 1 | 5 |
| KAS41 | 3 | 0 | 0 | 0 | 3 | 234 | 240 |
| KAS43 | | | | | | | |
| KAS44 | 3 | 0 | 0 | 0 | 4 | 38 | 45 |
| KAS45 | 1 | 0 | 0 | 0 | 1 | 4 | 6 |
| KAS46 | 4 | 0 | 0 | 0 | 3 | 24 | 31 |
| KAS47 | 1 | 0 | 0 | 0 | 3 | 161 | 165 |
| KMAS4 | 1 | 0 | 0 | 3 | 1 | 20 | 25 |
| KAS50 | 15 | 0 | 0 | 0 | 13 | 21 | 49 |
| KAS51 | 12 | 0 | 0 | 0 | 17 | 156 | 185 |
| KAS52 | 7 | 0 | 0 | 0 | 5 | 201 | 213 |
| KAS53 | 20 | 0 | 0 | 0 | 12 | 66 | 98 |
| KAS54 | 1 | 1 | 0 | 0 | 2 | 96 | 100 |
| KAS55 | 14 | 1 | 1 | 1 | 12 | 164 | 193 |
| KAS56 | 3 | 0 | 0 | 0 | 2 | 433 | 438 |
| KSAS1 | 12 | 1 | 0 | 1 | 3 | 13 | 16 | 46 |
| KCAS1 | 18 | 2 | 0 | 0 | 23 | 30 | 73 |
| KMAS6 | 5 | 0 | 0 | 5 | 3 | 67 | 80 |
| KAS48 | 15 | 0 | 0 | 0 | 17 | 93 | 125 |
| KAS59 | 4 | 0 | 0 | 0 | 4 | 137 | 145 |
| KCAS2 | 2 | 1 | 0 | 0 | 2 | 177 | 182 |
| KSAS2 | 6 | 0 | 0 | 2 | 0 | 5 | 38 | 51 |
| KAS60 | 1 | 0 | 0 | 0 | 1 | 12 | 14 |
| KAS61 | 2 | 0 | 0 | 0 | 3 | 419 | 424 |
| KAS62 | 8 | 0 | 0 | 0 | 21 | 287 | 316 |
| KAS63 | 7 | 0 | 0 | 0 | 18 | 346 | 371 |
| KAS65 | 5 | 0 | 0 | 0 | 5 | 278 | 288 |
| KACaSrS02 | 1 | 8 | 0 | 0 | 0 | 3 | 863 | 875 |
| KAMgSrS02 | 4 | 0 | 0 | 7 | 1 | 6 | 237 | 255 |
| KAS63 | 14 | 0 | 0 | 0 | 25 | 181 | 220 |
| KAS64 | 9 | 0 | 0 | 0 | 0 | 15 | 201 | 225 |
| KAS66 | | | | | | | |
| KAS67 | 3 | 0 | 0 | 0 | 0 | 1 | 7 | 11 |
| KAS68 | 1220 | 0 | 0 | 0 | 0 | 11 | 2187 | 3418 |
| KAS69 | 101 | 0 | 0 | 0 | 0 | 2 | 557 | 660 |
| KAS70 | 1109 | 0 | 0 | 0 | 0 | 8 | 1735 | 2852 |
| KAS71 | 96 | 0 | 0 | 1 | 0 | 3 | 512 | 612 |
| KAS72 | 667 | 0 | 0 | 0 | 0 | 7 | 2060 | 2734 |
| KAS73 | 10 | 0 | 0 | 0 | 0 | 3 | 355 | 368 |
| KAS74 | 5 | 0 | 0 | 0 | 0 | 4 | 509 | 518 |
| KAS75 | 20 | 0 | 0 | 0 | 0 | 5 | 350 | 375 |
| KAS76 | 2 | 0 | 0 | 1 | 0 | 2 | 43 | 48 |
| KAS77 | 2 | 2 | 0 | 0 | 0 | 2 | 22 | 28 |
| KAS78 | 2 | 0 | 0 | 0 | 2 | 2 | 129 | 135 |
| KAS79 | 2 | 0 | 0 | 0 | 0 | 2 | 24 | 28 |
| KAS80 | 2 | 0 | 0 | 0 | 0 | 1 | 3 | 6 |
| KAS81 | 1 | 1 | 0 | 0 | 0 | 1 | 2 | 5 |
| KAS82 | 3 | 0 | 0 | 1 | 0 | 3 | 46 | 53 |
| KAS83 | 2 | 2 | 0 | 1 | 0 | 3 | 99 | 107 |
| KAS84 | 2 | 2 | 0 | 0 | 0 | 2 | 10 | 16 |
| KAS85 | 3 | 2 | 0 | 1 | 0 | 3 | 28 | 37 |
| KAS76-2 | 2 | 0 | 0 | 2 | 0 | 2 | 118 | 124 |
| KAS77-2 | 2 | 2 | 0 | 0 | 0 | 0 | 4 | 8 |
| KAS 76-3 | | | | | | | |
| KAS82-2 | | | | | | | |
| KAS86 | | | | | | | |

The invention claimed is:

1. Inorganic fibres having the composition:

| $Al_2O_3$ | $>=5$ mol % |
|---|---|
| $K_2O$ | 12-40 mol % |
| $SiO_2$ | 5-80 mol %. | in which $SiO_2+Al_2O_3+K_2O>=80$ mol % and $<=100$ mol % and in which the fibres have a composition having a melting point greater than 1400° C.

2. The inorganic fibres, as claimed in claim 1, wherein:

| $Al_2O_3$ | 5-34 mol % |
|---|---|
| $K_2O$ | $<=34$ mol % |
| $SiO_2$ | $>=61$ mol %. |

3. The inorganic fibres, as claimed in claim 1, wherein:

| $Al_2O_3$ | 5-78 mol % |
|---|---|
| $K_2O$ | $>=17$ mol % |
| $SiO_2$ | 5-61 mol %. |

4. The inorganic fibres, as claimed in claim 1, having the composition:

| $Al_2O_3$ | $>=24$ mol % |
|---|---|
| $K_2O$ | $<=17$ mol % |
| $SiO_2$ | 5-61 mol %. |

5. The inorganic fibres, as claimed in claim 1, in which the amount of $K_2O$ is less than 30 mol %.

6. The inorganic fibres, as claimed claim 1, in which amount of $SiO_2$ is $>=20$ mol %.

7. The inorganic fibres, as claimed in claim 6, in which the amount of $SiO_2$ is $>=30$ mol %.

8. The inorganic fibres, as claimed in claim 7, in which the amount of $SiO_2$ is $>=35$ mol %.

9. The inorganic fibres, as claimed in claim 1, in which the amount of $SiO_2$ is below 70 mol %.

10. The inorganic fibres, as claimed in claim 1, in which the amount of $SiO_2$ is less than 52 mol %.

11. The inorganic fibres, as claimed in claim 1, in which the amount of $SiO_2$ is greater than 52 mol % and the fibres comprise viscosity modifiers in amounts sufficient to enable fibres of less than 10 μm to be formed.

12. The inorganic fibres, as claimed in claim 11, in which the viscosity modifier is selected from the group alkali metal oxides, alkaline earth metal oxides, lanthanide oxides, boron oxide, fluorides, and mixtures thereof.

13. The inorganic fibres, as claimed in claim 11, in which the viscosity modifier comprises magnesium in oxide or other form.

14. The inorganic fibres, as claimed in claim 1, in which the molar ratio $K_2O:Al_2O_3$ is less than 1.6.

15. The inorganic fibres, as claimed in claim 14, in which the molar ratio $K_2O:Al_2O_3$ is less than 1.5.

16. The inorganic fibres, as claimed in claim 14, in which the molar ratio $K_2O:Al_2O_3$ is greater than 0.4.

17. The inorganic fibres, as claimed in claim 1, in which the fibre has a composition having a melting point of greater than 1600° C.

18. The inorganic fibres, as claimed in claim 1, in which the fibre has a composition having a melting point of greater than 1650° C.

19. The inorganic fibres, as claimed in claim 1, in which the fibre has a composition having a melting point of greater than 1700° C.

20. The inorganic fibres, as claimed in claim 1, in which CaO+MgO+Na$_2$O+K$_2$O+BaO are present in an amount greater than 18% by weight.

21. The inorganic fibres, as claimed in claim 1, having the composition:

| | |
|---|---|
| Al$_2$O$_3$ | 10-50 mol % |
| K$_2$O | 12-40 mol % |
| SiO$_2$ | 30-78 mol %. | in which SiO$_2$+Al$_2$O$_3$+K$_2$O>=80 mol %.

22. The inorganic fibres, as claimed in claim 21, in which the amount of SiO$_2$ is in the range 40-60 mol %.

23. The inorganic fibres, as claimed in claim 21, in which the amount of K$_2$O is in the range 15-30 mol %.

24. The inorganic fibres, as claimed in claim 21, in which the amount of Al$_2$O$_3$ is in the range 15-40 mol %.

25. The inorganic fibres, as claimed in claim 21, in which the fibres comprise viscosity modifiers in amounts sufficient to enable fibres of less than 10 μm to be formed.

26. The inorganic fibres, as claimed in claim 21, in which the fibres are formed by forming a stream of melt and allowing the stream to contact spinning wheels.

27. The inorganic fibres, as claimed in claim 1, in which the fibres are formed by forming a stream of melt and allowing the stream to impinge upon a jet of gas.

28. The inorganic fibres, as claimed in claim 1, in which the fibres are formed from a melt by a rotary process in which the melt escapes through apertures in the circumference of a spinning cup and is blasted by hot gases.

29. The inorganic fibres, as claimed in claim 1, in which the fibres are formed from a melt by extruding the melt through fine apertures to form filaments.

30. The inorganic fibres, as claimed in claim 1, which have been at least partially crystallised by heat treatment following firing.

31. Thermal insulation comprising inorganic fibres as claimed in claim 1.

32. Thermal insulation, as claimed in claim 31, in which the insulation is in the form of blanket.

33. Mastics comprising inorganic fibres as claimed in claim 1.

34. Composite materials comprising inorganic fibres as claimed in claim 1.

35. Support structures for catalyst bodies comprising inorganic fibres as claimed in claim 1.

36. Friction materials comprising inorganic fibres as claimed in claim 1.

37. Inorganic fibres, as claimed in claim 8, in which the amount of SiO$_2$ is below 70 mol %.

38. Inorganic fibres, as claimed in claim 22, in which the amount of SiO$_2$ is in the range 47-52 mol %.

39. Inorganic fibres, as claimed in claim 23, in which the amount of K$_2$O is in the range 19-21 mol %.

40. Inorganic fibres, as claimed in claim 24, in which the amount of Al$_2$O$_3$ is in the range 25-35 mol %.

41. Inorganic fibres, as claimed in claim 21, wherein:

| | |
|---|---|
| Al$_2$O$_3$ | 15-40 mol % |
| K$_2$O | 15-30 mol % |
| SiO$_2$ | 40-60 mol %. | in which SiO$_2$+Al$_2$O$_3$+K$_2$O>=90 mol %.

42. Inorganic fibres, as claimed in claim 41, in which the amount of Al$_2$O$_3$ is in the range 25-35 mol %.

* * * * *